(No Model.)
J. W. HORN.
STALK CUTTER.
No. 248,745.　　　　　　　　Patented Oct. 25, 1881.
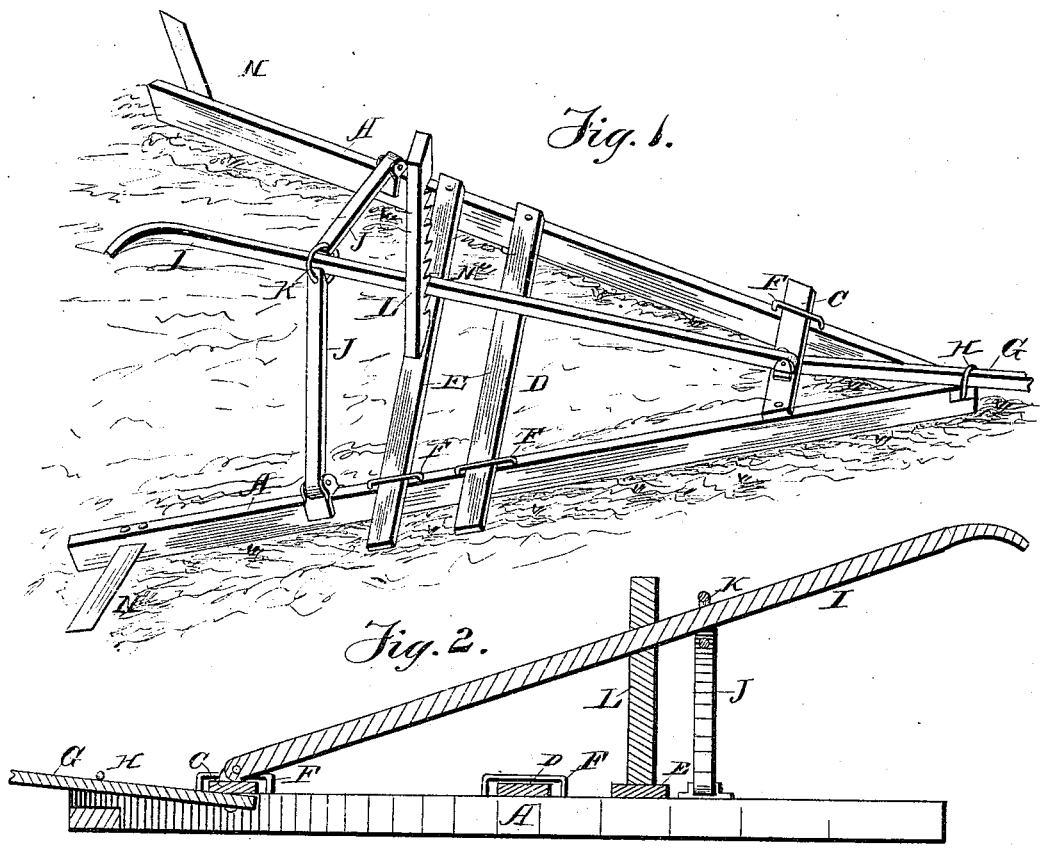

UNITED STATES PATENT OFFICE.

JOHN W. HORN, OF RHEA'S MILLS, TEXAS, ASSIGNOR OF ONE-FOURTH TO WILLIAM A. RHEA AND JAMES C. RHEA, OF SAME PLACE.

STALK-CUTTER.

SPECIFICATION forming part of Letters Patent No. 248,745, dated October 25, 1881.

Application filed May 14, 1881. (No model.)

*To all whom it may concern:*

Be it known that I, JOHN W. HORN, of Rhea's Mills, in the county of Collin and State of Texas, have invented certain new and useful Improvements in Stalk-Cutters; and I do hereby declare that the following is a full, clear, and exact description of the invention, which will enable others skilled in the art to which it appertains to make and use the same, reference being had to the accompanying drawings, which form a part of this specification.

Figure 1 is a perspective view of my improved stalk-cutter, and Fig. 2 is a longitudinal vertical sectional view.

The object of the invention is to simplify and cheapen the construction and arrangement of means for adjusting the pitch of the sides without affecting the usefulness or efficiency of the device; and to that end such means consist, essentially, in a single rack-bar, an operating-lever, and two links connecting said lever with the side bars.

Corresponding parts in the several figures are denoted by like letters of reference.

This invention relates to devices for cutting corn and cotton stalks; and it consists in certain improvements in the construction of the same, which will be hereinafter fully described, and particularly pointed out in the claim.

In the drawings hereto annexed, A A represent two beams or runners, pivoted together in any suitable manner at their front ends and diverging at their rear ends, as shown. One or both of said bars or runners are provided with pivoted cross bars or braces C D E, all of which are arranged to slide in staples, loops, or mortises F in the opposite runner.

G is the tongue, which is pivoted or adjustably secured to the front cross-bar, C, and which projects forwardly, resting upon the pivoted front ends of the beams A, where it is usually secured by a loop or bail, H.

I is a rearward-projecting rod or lever pivoted to the front cross-bar, C, or, if preferred, to the converging point of the runners or beams A.

J J are a pair of connecting-rods hinged or swiveled to the beams A, as shown, and projecting upward toward each other, their upper ends being connected by a ring or link, K, through which the lever I passes, as represented in the drawings.

L is an upright or rod projecting upwardly from the rear cross-bar, E, and having a series of recesses or notches, M, in any one of which the lever I may be adjusted.

Knives or cutters N are secured at the rear ends of the beams or runners A.

It will be seen that the operator may, by raising or lowering the rear end of the lever I, draw the rear ends of the frame-beams A together or apart through the medium of the pivoted connecting-rods J, thus adapting the machine to cut rows of stalks growing at different distances apart. By adjusting the lever I in one of the notches M the frame-beams may be retained securely in any desired position in relation to each other.

From the foregoing description, and by reference to the drawings hereto annexed, the operation and advantages of my invention will be readily understood.

By means of the levers and connecting-rods the frame-beams may be adjusted while the machine is in motion, thus enabling it to cut corn and cotton stalks, when growing in irregular rows, without the delay and loss of time incurred with differently-constructed machines.

This device is simple, durable, and easily constructed and operated.

I am aware that numerous patents have been granted for stalk-cutters having laterally-adjustable side pieces connected by suitable cross-braces or connecting-pieces; but this I do not claim as my invention, the same consisting substantially in the improved means for effecting said lateral adjustment, as herein set forth.

What I claim as new is—

As an improvement in stalk-cutters, the herein-described means of adjusting the cutters laterally, consisting of the upright rod L, having a series of recesses or notches, M, the adjustable rearwardly-inclined rod or handle I, pivoted or hinged at its front lower end, and the connecting-rods J J in rear of the upright M, joined together by ring K, through which passes the handle I, all arranged and operating substantially as and for the purpose herein shown and specified.

In testimony that I claim the foregoing as my own I have hereto affixed my signature in presence of two witnesses.

JOHN W. HORN.

Witnesses:
 J. R. LITTELL,
 WM. BAGGER.